Figure 1:
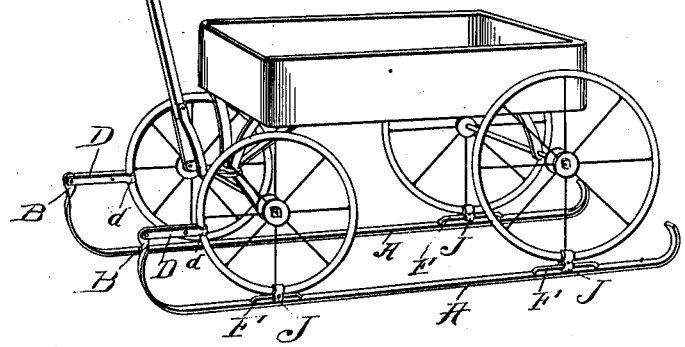

L. BEFFEL.
SLEIGH RUNNER FOR WHEELED VEHICLES.
APPLICATION FILED SEPT. 9, 1909.

970,874.

Patented Sept. 20, 1910.

2 SHEETS—SHEET 1.

Witnesses

Inventor
Leonard Beffel,

Attorney

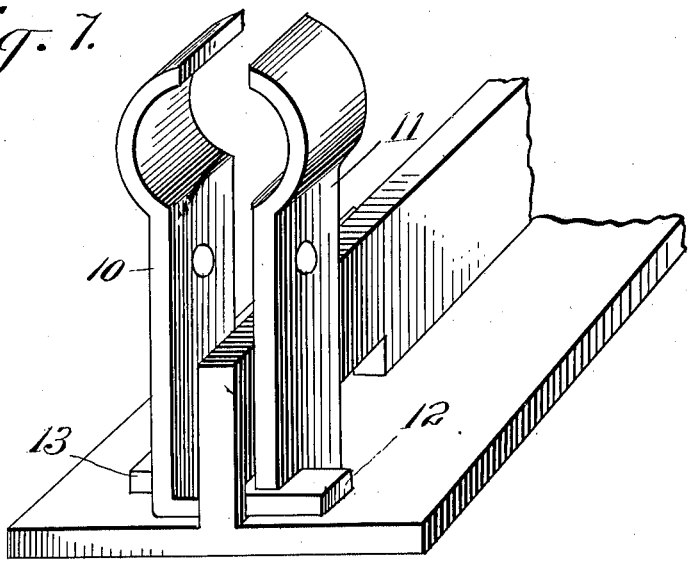
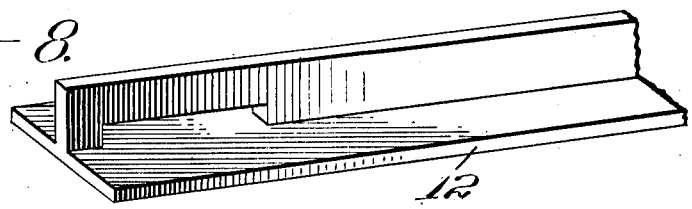
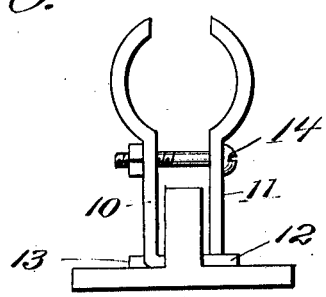

UNITED STATES PATENT OFFICE.

LEONARD BEFFEL, OF JACKSON, MICHIGAN.

SLEIGH-RUNNER FOR WHEELED VEHICLES.

970,874. Specification of Letters Patent. Patented Sept. 20, 1910.

Application filed September 9, 1909. Serial No. 516,860.

*To all whom it may concern:*

Be it known that I, LEONARD BEFFEL, a citizen of the United States of America, residing at Jackson, in the county of Jackson and State of Michigan, have invented certain new and useful Improvements in Sleigh-Runners for Wheeled Vehicles, of which the following is a specification.

This invention relates to sleigh runners and particularly to an attachment for wheeled vehicles in order that the said wheeled vehicles may be converted into sleighs.

An object of this invention is to provide novel means for attaching sleigh runners to wheels of vehicles, means being also provided for connecting the front ends of the sleigh runners to the vehicle wheels in order that movement of the vehicle longitudinally of the sleigh runners may be prevented; furthermore, an object of this invention is to provide sleigh runners having clips designed to embrace wheel fellies, means being provided for adjustably connecting the clips to the sleigh runners in order that the said sleigh runners may be used in connection with vehicles of different wheel bases.

A still further object of this invention is to provide means for clamping the wheels and for simultaneously binding the wheel clamping means against the extensions of the sleigh runners in order that the frictional engagement of the clamping means and runners will prevent movement of the said clamping means.

A still further object of this invention is to produce sleigh runners, each of which may be manufactured by stamping from a single piece of metal, whereby the sleigh runner and the clamp or clip engaging members are formed simultaneously, thus minimizing the cost of construction and producing a sleigh runner which will possess advantages in points of simplicity, efficiency and durability.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 2:
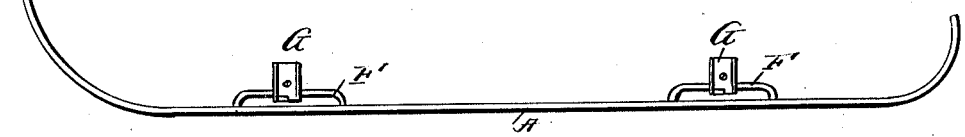
Figure 3:
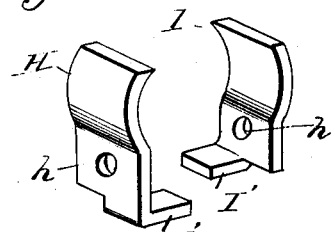
Figure 4:
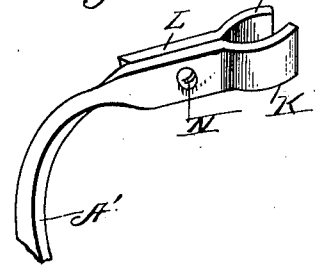
Figure 5:
Figure 6:
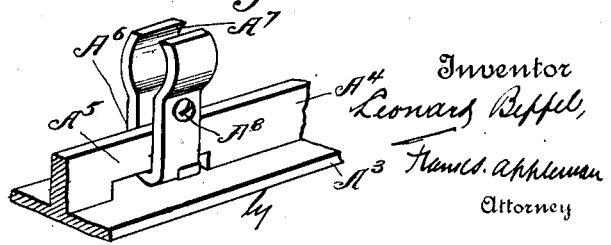

Figure 1, illustrates a view in perspective of a vehicle with the sleigh runners applied thereto; Fig. 2, illustrates an enlarged detail view of one of the runners; Fig. 3, illustrates a perspective view of the members of a clamp; Fig. 4, illustrates an enlarged detail view in perspective of a modified construction whereby the forward end of the runner is extended and is formed into a member of a clamp for engaging the felly; Fig. 5, illustrates a detail view in perspective of a fragment of a sleigh runner; Fig. 6, illustrates, by a view in perspective, a fragment of a sleigh runner and clamp embodying a slightly modified construction; Fig. 7, illustrates a perspective view of a sleigh runner in which a two-part clamp such as is shown in Fig. 3, is utilized; Fig. 8, illustrates a perspective view of a fragment of a sleigh runner; and Fig. 9, illustrates an end view thereof with a bolt applied to the clamp.

In these drawings A, denotes a sleigh runner having its forward end bent upwardly and twisted to form an ear B, which ear is apertured to receive the pin C, by which the clamp is connected to the runner.

The clamp comprises two parallel plates D, D, having their inner ends bent as shown at *d*, to embrace the felly. The plates are clamped together by means of the bolt E. The runner proper is provided on its upper surface with curved bars F, each having their ends secured to the runner and the said bars form supports for the wheels of the vehicle and guides for the clamps G, G. The clamps are each formed of two members H and I, having concaved inner surfaces forming, when the clamps are in operative position, seats for a felly of a wheel, and the two members are provided with apertures *h* and *i*, respectively, designed to receive clamping screws or bolts J. The lower end of each clamping member is provided with a lug H′ and I′, respectively, extending one-half or approximately one-half the width of the said member and the lug of one member is designed to lie in contact with the lug on the other member and under the lower edge of the member with which it coacts. The said lugs are also designed to be inserted between the bar F, and the sleigh runner and the clamp of each bar will be movable longitudinally of the said bar to the extent of the length of the horizontally disposed portion of said bar, hence it will be seen that the clamps may be moved to positions to engage fellies which have been applied to the bars and when the clamping screws or bolts J, are fastened, the clamps will bear against the surfaces of the fellies and the surfaces of the bars and the vehicle will be rigidly held on the said runners especially as the front wheels will be additionally braced by the clamps at the front of the runners.

In Fig. 4, I have shown a modified construction of the runner which instead of being provided with the plates to form the clamps, is extended to form a goose neck A', the extremity of the said runner being bent as shown at K, to form one member of a clamp which coacts with a plate L, having a curved end M, forming the other member of the clamp. The plate L, is secured to the end of the runner by means of a screw or bolt N, and by the elements just mentioned a felly of a wheel may be secured to a runner in a manner similar to that shown in Fig. 1, with the exception that the runner and one member of the clamp are integral.

In Fig. 5, I show a further modified construction or manner of forming a runner A², by which I strike from the said runner the bar F', thus forming the bar and runner integrally and minimizing the cost of construction.

In Fig. 6, I show another modification in which the runner A³, is provided with a rib A⁴, and the rib has a slot A⁵, formed therein. The clamp in this construction is formed of a single piece of metal bent approximately U-shaped as shown at A⁶, and the said clamp has its ends bent to form a socket A⁷, designed to receive the felly of a wheel. The ends of the clamp are held against the felly of the wheel by means of the bolt or screw A⁸, in much the same manner that the members of the clamp shown in Fig. 3, are held in operative relation to the fellies of the wheels.

In the form shown in Figs. 7, 8, and 9, the runner is the same as that shown in Fig. 6, and I apply thereto a clamp in two parts 10 and 11, which are similar in all respects to the clamp shown in Fig. 3, except that it is slightly longer, the lower ends of the clamping members having lugs 12 and 13, respectively, which are supported on the upper surface of the runner as is fully shown in Fig. 7, thus obviating any rocking motion of the clamping sections owing to the fact that the lug of one section extends well on the lug of the other section. The clamping members are drawn together through the medium of the bolt 14.

I claim—

1. A sleigh runner having horizontally disposed bars integral therewith laterally adjustable, clamps adapted to engage said bars and to engage the wheel fellies, and means for actuating the clamps.

2. A sleigh runner having a bar struck up from between its edges, said bar having an aperture thereunder, coördinate clamping members coacting with the said bar to engage the wheel felly, said clamping members being laterally adjustable to fit wheel fellies of various widths.

3. A sleigh runner having horizontally disposed bars secured thereto, said bars having horizontally disposed apertures thereunder, clamps having horizontal extensions disposed within the apertures, said clamps being laterally adjustable for receiving wheel fellies of different sizes.

4. A sleigh runner having a raised portion, said raised portion having a slot thereunder, coördinate members disposed on the opposite sides of said raised portion, and adapted to engage said raised portion, said clamping member being provided with means of adjustment to wheel fellies of various widths.

In testimony whereof, I affix my signature in the presence of two witnesses.

LEONARD BEFFEL.

Witnesses:
 FRED J. BEAMAN,
 GRANT H. BAILEY.